INVENTOR
MELVIN M. KAUFMAN
BY Robert R. Hubbard
ATTORNEY

INVENTOR
MELVIN M. KAUFMAN

BY Robert R. Hubbard
ATTORNEY

TRANSLATING INFORMATION WITH MULTI-PHASE CLOCK SIGNALS

Filed Feb. 28, 1968 4 Sheets-Sheet 3

INVENTOR
MELVIN M. KAUFMAN
By Robert R. Hubbard
Attorney

INVENTOR
MELVIN M. KAUFMAN
BY Robert R. Hubbard
ATTORNEY

United States Patent Office 3,524,077
Patented Aug. 11, 1970

3,524,077
TRANSLATING INFORMATION WITH MULTI-PHASE CLOCK SIGNALS

Melvin M. Kaufman, Willingboro, N.J., assignor to RCA Corporation, a corporation of Delaware
Filed Feb. 28, 1968, Ser. No. 709,037
Int. Cl. H03k *17/60*
U.S. Cl. 307—246 29 Claims

ABSTRACT OF THE DISCLOSURE

Multi-phase clock systems which employ field-effect transistor circuits operable under the control of three and four phase clock signals are described. Building block circuits, such as the T, the 2-H and the 3-H types of circuits are employed in various combinations with the three and four phase clock signals. In particular, the illustrated systems describe an all T-circuit shift register or bit of delay and a mixed T and 2-H circuit shift register or bit of delay.

BACKGROUND OF THE INVENTION

This invention relates to digital systems and, in particular, to systems wherein signal translation is effected under the control of multi-phase control or clock signals.

Multi-phase clocking of digital systems employing field-effect transistors of one conductivity type or all-same-channel type devices has been employed for many reasons. The usual one-channel type, for example, P-metal oxide semiconductor (P-MOS), digital circuit includes a pair of P-MOS devices, one serving as an inverter device and the other as a load device for the inverter. For the signal condition where the inverter is turned on, a DC path to the circuit reference (ground) exists. This DC path not only results in steady state power dissipation but also requires that the load and inverter devices have different transconductances (*gm*'s) in order to establish a voltage divider action to thereby yield a proper output digital level. The ratio of *gm*'s for the two devices could be as high as 30 depending upon the design margins desired for a particular system. Since the *gm* of an MOS device is related to its size, the *gm* ratio is generally achieved by different size devices. However, the need for different size devices limits the number of devices which can be fabricated within a given area by a given fabrication technology.

Multi-phase clock signals have been employed to eliminate the DC path to ground condition and increase the speed potential of P-MOS systems. The multi-phase technique is a dynamic one in which each cycle involves a precharging of the circuit output capacitance node, sampling the circuit data input and holding the circuit in the sampled condition. Since there is no DC path to ground condition and hence no need for voltage divider action, there is relatively less power dissipation. Smaller inverter devices can be employed whereby more devices can be fabricated in a given area.

Some prior art systems employ four-phase clocks with either a 25% duty cycle for each clock phase or a combination of 25% duty cycle for alternate ones of the clock phase and a 50% duty cycle for the other ones of the clock phases. By 25% duty cycle, for example, is mean that the phase of the clock signal is on or that its excursion from a base line has a duration of substantially 25% or one-quarter of the clock cycle period, assuming rise and fall time are negligible. For the case of the all 25% duty cycle clock signals, a charge redistribution problem arises during the sampling interval as internal node capacitances are not precharged during the precharge interval. The mixed 25% and 50% duty cycle clock signal systems tend to avoid this charge redistribution problem. However, the latter systems introduce a noise feed-through problem which causes serious signal degradation and hence poor signal-to-noise ratios. In addition, only one-fourth of the clock period is available for precharging. Consequently, the clock signal repetition rate is limited to about four times the minimum precharge time for a given MOS device. Furthermore, the mixed duty cycle signal scheme can be difficult to generate.

Although four phase clocked field-effect transistor systems have some advantages, they require a bus distribution which includes at least four clock lines to each elemental circuit cell when implemented as a large scale integrated (LSI) structure. The four clock lines occupy chip area and, thus, limit the efficiency of the device or cell and the connector topology or layout.

An object of the present invention is to provide novel and improved multi-phase clock systems.

Another object of the present invention is to provide a multi-phase clock system in which noise feed-through problems are reduced.

Still another object is to provide novel and improved circuit connections useful in multi-phase clock systems.

Yet another object is to provide a novel and improved 50% duty cycle plural phase clocked field-effect transistor system.

A further object is to provide novel and improved three and four phase, 50% duty cycle, clocked field-effect transistor systems.

Yet a further object is to provide novel three-phase clocked field-effect transistor systems.

BRIEF SUMMARY OF THE INVENTION

According to the invention a multi-phase clock system includes first and second field-effect transistor circuits with each circuit having first, second and third clock terminals and first, second and third transistors. In each circuit, the conduction channels of the first and second transistors are connected in series with the associated first and second clock terminals. The gate electrodes of the first and third transistors are connected to the first and third clock terminals, respectively. The gate electrode of the first transistor is connected to an input for the circuit. In some embodiments the channel of the third transistor is connected between the circuit output and a point common to both the series connected channels of the first and second transistors. In other embodiments, the channel of the third transistor is connected in series with the channels of the first and second transistors, with the circuit output being taken from a point on the series chain of connected channels. A coupling circuit couples the outputs of the first and second circuits to the input of the second circuit and a load, respectively. An input circuit means applies input signals to the first circuit input. A control means including a clock generator causes the circuits to translate the input signals to the load by applying plural phase clock signals to the various clock terminals.

In some embodiments of the invention each clock signal phase has a 50% duty cycle. In one of these embodiments, there are four phases with each phase lagging its preceding phase by approximately 90° or one-fourth of the clock period.

In another of these 50% duty cycle embodiments, there are three phases with one of the phases having a frequency twice the frequency *f* of the other two phases. The other two phases are approximately 180° out of phase.

It is a further feature of the invention that the coupling means may include a third circuit having only first and second clock terminals and only first and second field-effect transistors having their gates and channels connected in the same manner as the first and second transistors in the first and second circuits. The third circuit output is taken from a point common to the channels of both its transistors. The third circuit input and output are coupled to the output and input of the first and second circuits, respectively. This feature of the invention can be employed with either the three or four phase 50% duty cycle clocks.

BRIEF DESCRIPTION OF THE DRAWING

In the accompanying drawing, like reference characters denote like components, and.

DETAILED DESCRIPTION OF THE INVENTION

Figure 1:
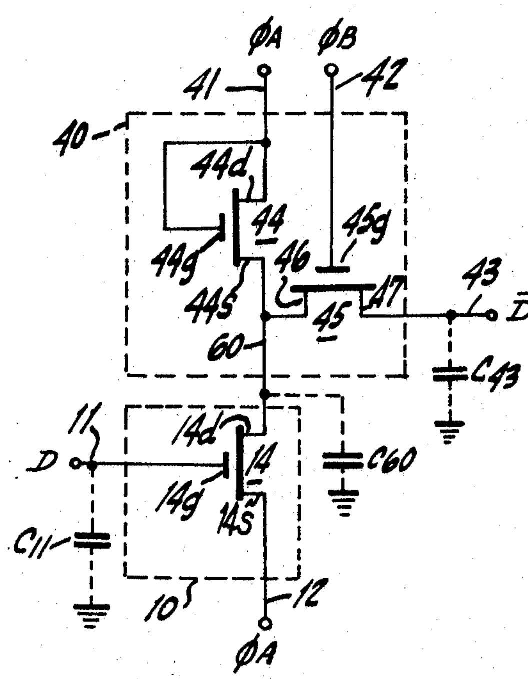
Fig.1. PRIOR ART
FIGS. 1, 2 and 3 are circuit diagrams of known circuits which can be employed as building blocks to construct multi-phase clock systems in accordance with the present invention.

The multi-phase clock circuits and systems of the present invention may be constructed with discrete components or by means of integrated circuit processes. As used herein, the term "integrated circuit" refers to those technologies by which an entire circuit (or circuits) can be formed as by diffusion or thin films in or on one or more substrates (or chips) of materials, such as silicon, glass, sapphire, or the like.

The active devices contemplated for use in practicing the present invention are preferably insulated-gate field-effect transistor (IGFET) devices.

An IGFET may be defined generally as a majority carrier field-effect device which includes a body of semiconductor material. A carrier conduction channel within the semiconductive body is bound at one end thereof by a source region and at the other end thereof by a drain region. The gate or control electrode means overlies at least a portion of the carrier conduction channel and is separated therefrom by a region of insulating material. Due to the insulation between the gate electrode and the channel, the input impedance of the IGFET is very high, on the order of $10^{15}$ ohms or more, so that substantially no direct current (DC) flows in the electrode circuit. Thus, the IGFET is a voltage controlled device. Signals or voltages applied to the gate electrode means control, by field-effect, the conductance of the channel.

Two known types of insulated-gate field-effect transistors are the thin-film transistor (TFT) and the metal-oxide semiconductor (MOS). Some of the physical and operating characteristics of a TFT are described in the article "The TFT—A New Thin-Film Transistor," by P. K. Weimer, appearing at pages 1462–1469 of the June 1962 issue of the Proceedings of the IRE. The MOS transistor is described in an article entitled, "The Silicon Insulated-Gate Field-Effect Transistor," by S. R. Hofstein and F. P. Heiman, in the September 1963 issue of the Proceedings of the IEEE at pages 1190–1202.

Such transistors may be of either the enhancement type or the depletion type. In a depletion type transistor there is current flow through the conduction channel when the source and gate electrodes are at the same potential ($V_{gs}=0$). This current flow either increases or decreases depending upon the polarity of the applied voltage between the gate and source electrodes. In an enhancement type transistor there is substantially no current flow through the conduction channel until $V_{gs}$ is at least equal in magnitude to the threshold voltage $V_t$ and of the same polarity as the drain-to-source voltage ($V_{ds}$). The enhancement transistor is of particular interest in the practice of this invention.

An IGFET may be either a P-type or an N-type transistor depending upon the majority carriers involved in drain current conduction. A P-type transistor is one in which the majority carriers are holes; whereas an N-type unit is one in which the majority carriers are electrons.

By way of example and completeness of description, the invention is illustrated with IGFET devices of the MOS variety of P-type conductivity (P-MOS). It is noted at this point that the semiconductor material can be any suitable material which is generally employed to make insulated-gate field-effect devices in the semiconductor art. For the purpose of the description which follows, all semiconductor materials will be assumed to be silicon, unless otherwise specified.

IGFET BUILDING BLOCK CIRCUITS

Figure 2:
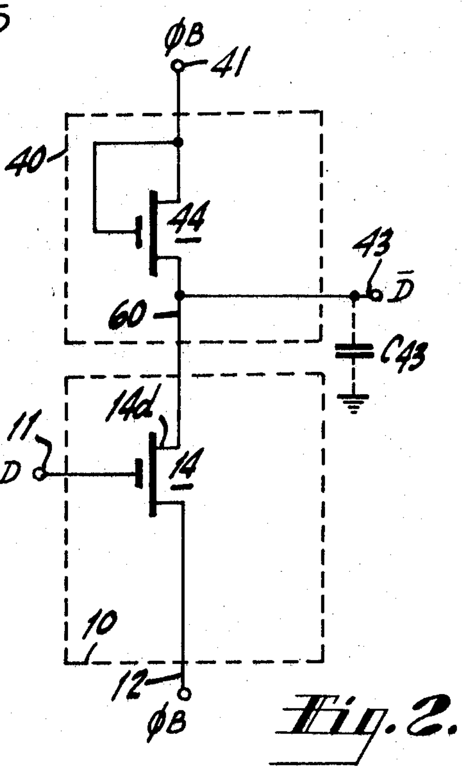
Fig.2. PRIOR ART
Figure 3:
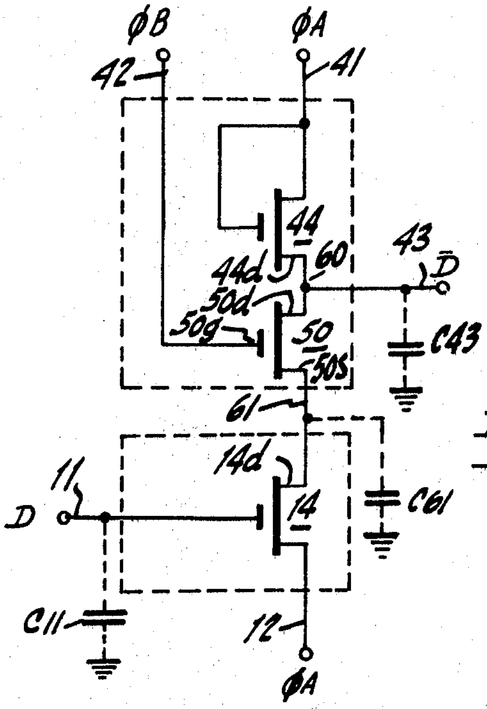
Fig.3. PRIOR ART

Multi-phase clock systems according to the invention may be constructed with various basic IGFET building block circuits, some of which are shown in FIGS. 1, 2 and 3. Referring in particular to the building block circuit in FIG. 1, there is shown a logic section 10 and a load section 40. A clock signal $\phi$A is applied to a load section clock terminal 41 and to a logic section clock terminal 12. Another clock signal $\phi$B is applied to another load section clock terminal 42. The characters A and B represent different phases of either the three or four phase clock signals, which are hereinafter described. The input information is applied to the logic section at an input terminal 11 and the output is taken from the load section at an output terminal 43. The logic seciton 10 can include a single P-MOS device as in FIG. 1 for a simple inversion or may include two or more P-MOS devices arranged in series, in parallel or in series-parallel combinations to perform more complex logic functions. Thus, in the building block circuit of FIG. 1 for an applied signal D, the output signal is the complement $\overline{D}$ of D.

The logic section 10 has at least one P-MOS device 14 and the load section 40 has two P-MOS devices 44 and 45. The gate electrode **14*g* is connected to the input terminal 11, while the gate electrodes 44*g* and 45*g* are connected to the load section clock terminals 41 and 42, respectively. The conduction channels of P-MOS devices 14 and 44 are connected in series with the clock terminals 12 and 41. To this end, the source lead 14*s* is connected to the clock terminal 12 and the drain lead 44*d* is connected to the clock terminal 41. The drain lead 14*d* and the source lead 44*s* are connected to a common point 60. The conduction channel of P-MOS device 45 is connected between the common point 60 and the output terminal 43. To this end, one of the source and drain leads 46 is connected to the common point 60 and the other of the source and drain leads 47 is connected to the output terminal 43**.

Also shown in FIG. 1, are an input capacitance C11, an output capacitance C43 and an internal node capacitance C60. The input capacitance C11 is connected (by dashed connections) between the input terminal 11 and a point of reference potential, illustrated as circuit ground by the conventional symbol therefor. The input capacitance C11 represents not only the input capacitance of the P-MOS device 14, but also the output capacitance of the input circuit (not shown), as well as any stray capacitance associated with the input terminal 11.

Similarly, the output capacitance C43 is connected between the output terminal 43 and circuit ground. The output capacitance 43 represents not only the output capacitance of the P-MOS device 45 but also the input capacitance of any load circuit or circuits connected to to terminal 43 as well as stray capacitance associated with the terminal 43.

The internal node capacitance C60 is connected between the common point 60 and circuit ground. The internal node capacitance C60 represents all of the capacitance due to the common connection of the leads 44*s*, 14*d* and 46. The building block circuit in FIG. 1 is sometimes referred to as a T circuit. The T-circuit derives its name primarily from its circuit diagram (as illustrated) where the transmission gate P-MOS device 45 forms the leg of a T with the load device 44 and the logic section device 14.

Referring next to the building block circuit in FIG. 2 there is shown a single load device 44 connected in the same manner as in the T-circuit of FIG. 1 except that the clock signal phase $\phi$B is applied to clock terminal 41 in the load section 40. The logic section 10 is identical to the logic section of the T-circuit. However, the logic section 10 may include two or more P-MOS devices to perform more complex logic functions as heretofore mentioned. The output terminal 43 is connected to the common point 60.

The building block circuit in FIG. 2 is sometimes referred to as a 2-HIGH or 2-H circuit. The 2-H circuit derives its name primarily because only a single P-MOS device 44 is stacked (coupled in cascode) in the load section 40. This single P-MOS device when added to the simplest single inverter device configuration for the logic section 10 forms a series stacked or cascode count of two devices.

Another basic building block useful either by itself or mixed with T or 2-H circuits is shown in FIG. 3. This building block differs from the T or 2-H circuits in that it has an additional P-MOS load device 50 having its conduction channel connected in series (stacked or in cascode) with the channels of devices 14 and 44. To this end, source lead 50*s* and drain lead 14*d* are connected to a common point 61. Drain lead 50*d* and drain lead 44*d* are connected to common point 60. The gate electrode 50*g* is connected to clock terminal 42. Internal node capacitance C61 is associated with internal mode 61.

The building block circuit in FIG. 3 is sometimes referred to as a 3-HIGH or 3-H circuit. The 3-H circuit derives its name from the number of series stacked or cascode load devices including the simplest single inverter device.

The building block circuits can be classified according to which of the phases A and B of clock signal are applied to their respective clock terminals 12, 41 and 42. In the description which follows, the building block circuit classification for T and 3-H circuits will be represented by $\phi$A, $\phi$B T and $\phi$A, $\phi$B 3-H, respectively. For example, a T-circuit having phase $\phi$1 applied to its clock terminals 12 and 41 and phase $\phi$2 applied to its terminal 45 will be designated as a $\phi$1, $\phi$2, T-circuit; a T-circuit having phase $\phi$3 applied to its terminals 12 and 41 and phase $\phi$4 applied to its terminal 45 will be designated as a $\phi$3, $\phi$4 T-circuit. It is noted at this point that the phase B for a particular phase A in the four phase 50% duty cycle clock signals is always the next succeeding phase. Thus, in four phase examples, phase $\phi$B will be dropped from the designation such that only $\phi$A T and $\phi$A 3-H will be employed. For the case of three phase clock signals, however, the phase B for a particular phase A can be either of the other two phases. Finally, the classification for the 2-H circuit will be designated merely as $\phi$B 2-H in both three and the four phase examples.

FOUR PHASE CLOCK SIGNALS

Figure 4:
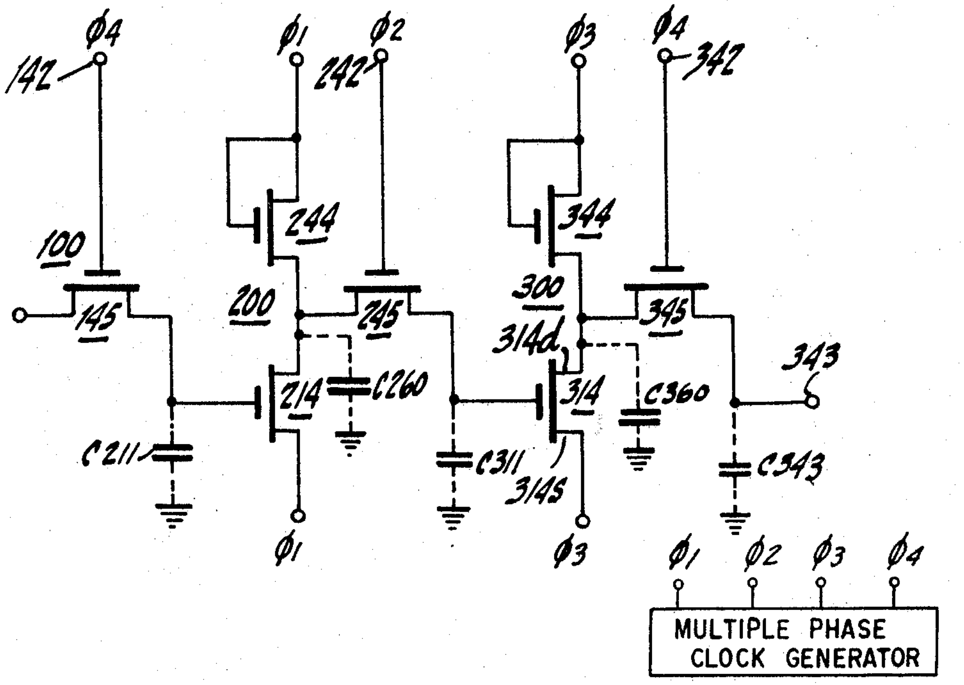
FIG. 4 is a circuit diagram of an embodiment of a four phase clock system employing the building block circuit of FIG. 1.
Figure 5:
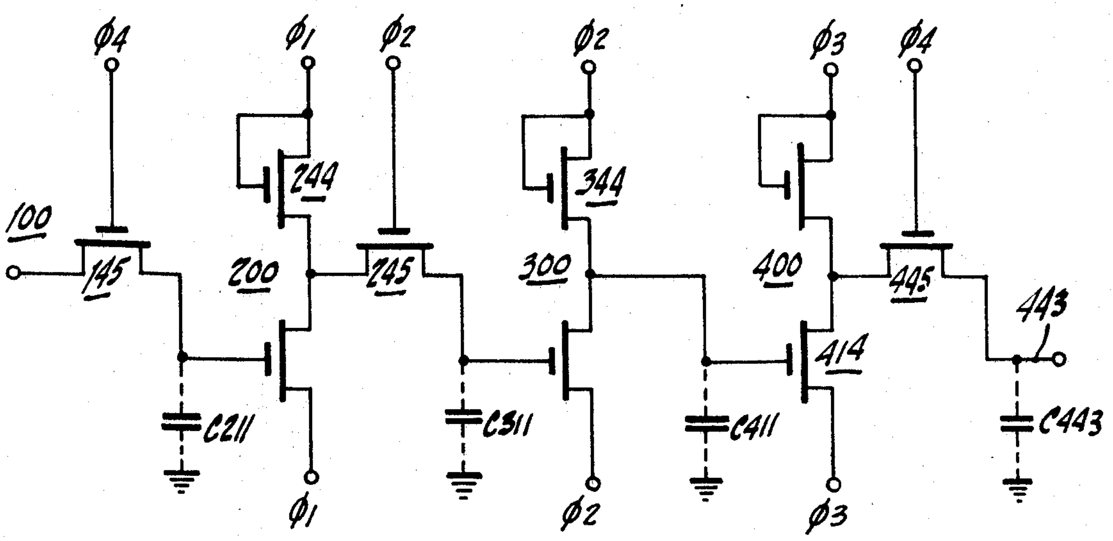
FIG. 5 is a circuit diagram of another embodiment of a multi-phase clock system employing the building block circuits of both FIG. 1 and FIG. 2.

The building block circuits in FIGS. 1, 2 and 3 can be employed in different combinations to construct a variety of systems. For the purpose of example and completeness of description of the preferred four phase embodiments, the systems of FIGS. 4 and 5 are presented. The FIG. 4 system shows a $\phi$1 T-circuit connected in cascade with a $\phi$3 T-circuit to form a shift register stage or bit of delay. The FIG. 5 system differs from the FIG. 4 system in that a $\phi$2 2-H circuit is inserted between the $\phi$1 T and $\phi$3 T-circuits to obtain a signal inversion or other logic net function. For the shift register systems in FIGS. 4 and 5, the tens and units digits of the reference characters denote like or similar components of the T-circuit building block. The hundreds digit of the reference character denotes a particular stage of the register. For example, the characters 244 and 344 designate particular components (P-MOS devices) in the stages 200 and 300 respectively.

For the purpose of the following description, the input to the stage 200 in both FIGS. 4 and 5 is assumed to be from a $\phi$3 T-circuit 100 of which only the transmission gate P-MOS device 145 is shown. In accordance with the above description, the load capacitance C343 represents the output capacitance of the $\phi$3 T-circuit 300 as well as the input capacitance of other circuits being driven from output terminal 343. Also, the input capacitances C211 and C311 (as well as C411 in FIG. 5) are assumed to include the input capacitance of the corresponding driving stages.

In accordance with the above description, a P-MOS device is turned on (i.e., current flows in its conduction path only when its gate-to-source voltage $V_{gs}$ is more negative than $-V_t$ volts, where $V_t$ is the absolute value of the threshold voltage of the P-MOS. For $V_{gs}$ values more positive than $-V_t$ volts, the P-MOS is turned off (i.e., substantially no current can flow in its conduction channel). In the clock signal waveforms of FIG. 8, the negative voltage of $-V_0$ volts is chosen as more negative than $-V_t$ volts.

It might be noted at this point that a load P-MOS device, such as P-MOS device 244, having its gate and drain leads connected to the same clock signal phase is turned on when that phase is at $-V_0$ volts and turned off when the phase is at 0 volt. A logic net or input P-MOS device, such as P-MOS device 214, is turned off when the clock phase applied to its source lead is $-V_0$ volts and is enabled to be turned on when the clock phase is at 0 volt, depending upon the charge condition of its associated input capacitance. Finally, a transmission gate device, such as P-MOS device 245 is turned on when the clock phase applied to its gate lead is at $-V_0$ volts (at least until the associated input capacitance C311 is discharged) and is turned off when the clock phase is 0 volt.

Figure 6:
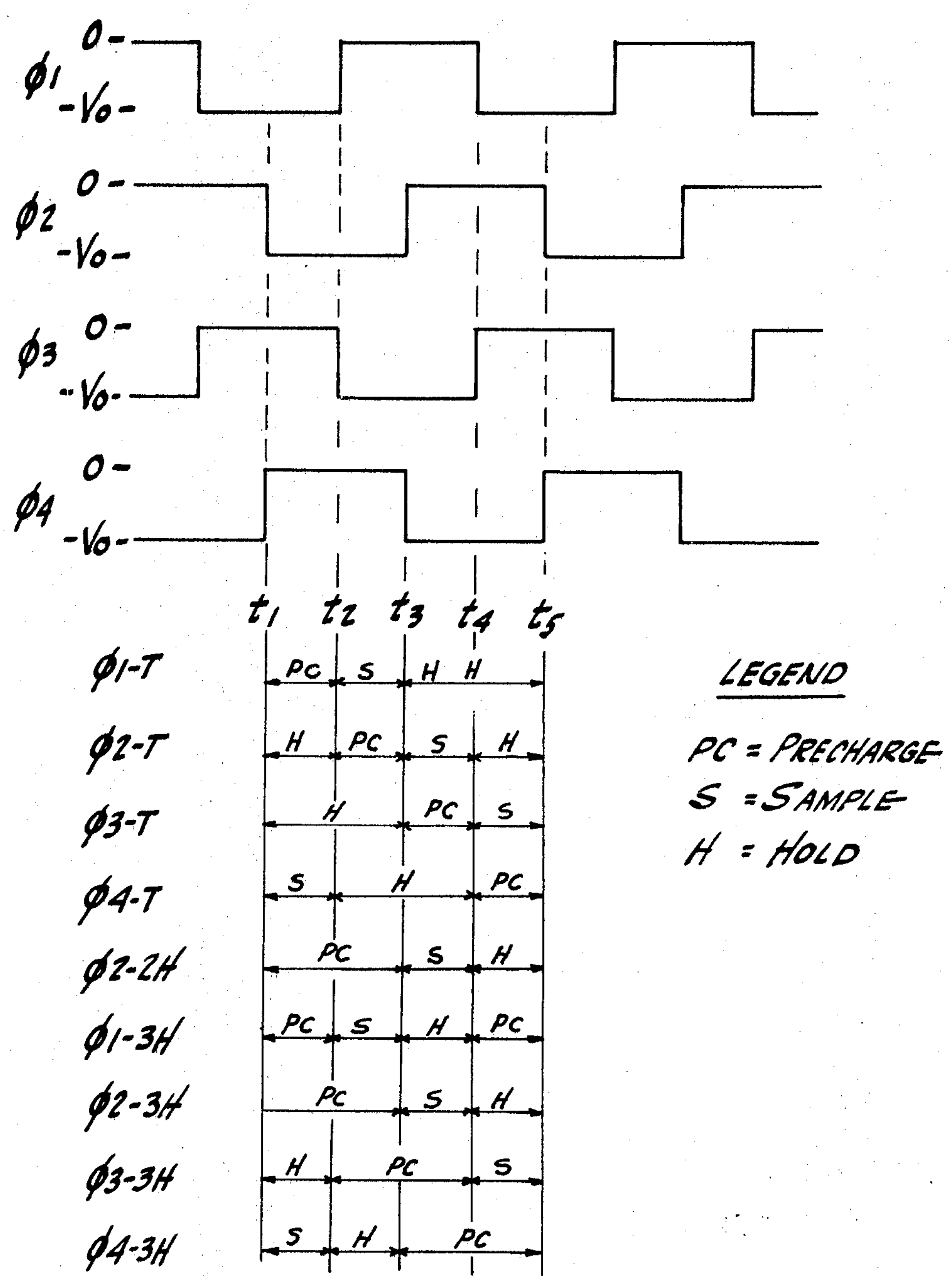
FIG. 6 is a waveform diagram of a four phase 50% duty cycle clock signal waveform for the FIG. 4 and FIG. 5 systems.

The clock signal waveforms in FIG. 6 are four phases of clock signals where each phase lags the preceding phase by approximately one-fourth of the clock period or 90° and where each phase has a 50% duty cycle. Four phase clock signals of this type could be generated by any suitable clock generator. For example, the four phase clock signals could be obtained from a four stage ring counter driven at four times the desired clock frequency for the four phase field-effect transistor system. It is noted at this point that when the overlap time of the fall and rise of different clock phases approaches the response time of the field-effect transistor circuits, invalid information may be translated. For example, the precharge condition of a driving stage could develop the sample condition of a driven stage. This undesirable condition can be avoided by shrinking, for example, the on time ($-V_0$ volts signal level) of the clock phases and correspondingly the precharge intervals.

Also shown in FIG. 6, is the basic operational activity for T-circuits, a $\phi$2 2-H circuit and 3-H circuits which are operated under the control of four phase clock signals. This activity can generally be categorized, for example, for stage 200 in FIG. 4, as precharging the output capacitance node C311 via load section devices 244 and 245 during a first time interval, sampling the input capacitance C211 during a second time interval and holding the charge condition of the output capacitance C311 so that it may be sampled by the next succeeding stage 300. In the drawing, the symbols PC, S and H are employed for precharge, sample and hold, respectively, as indicated by the legend accompanying FIG. 6.

In particular for the T-circuits, the precharge interval for a $\phi1$ T-circuit is from $t_1$ to $t_2$; the sample interval is from $t_2$ to $t_3$; and the hold interval is from $t_3$ to $t_5$ as shown in FIG. 6. Similar precharge, sample and hold intervals are indicated for the $\phi2$ T, $\phi3$ T and $\phi4$ T-circuits, $\phi2$ 2-H circuit and the $\phi1$ 3-H, $\phi2$ 3-H, $\phi3$ 3-H and $\phi4$ 3-H circuits. The operational activities for $\phi1$ 2-H, $\phi3$ 2-H and $\phi4$ 2-H circuits, though not shown in FIG. 6, are similar to the activity for the $\phi2$ 2-H circuit. Basically, for a 2-H circuit in four phase 50% duty clock cycles, the circuit precharges its output capacitance when the associated clock phase is $-V_0$ volts and samples when it is 0 volt. A 2-H circuits holds information by virtue of the fact that the previous or driving stage is holding information.

By inspection of the operational activity for each phase of the clock waveform. It can be determined what type of circuit can drive another type of circuit. The rule is that the input capacitance node to a circuit cannot be allowed to have its charge condition changed while it is being sampled. This means that a driving circuit must be holding while the driven circuit is sampling. For example, a $\phi3$ T-circuit can drive a $\phi1$ T-circuit and vice versa.

The circuit operation of the register system in FIG. 4 will now be described. At time $t_1$ clock phase $\phi1$ is already at $-V_0$ volts and clock phase $\phi2$ switches to $-V_0$ volts. Both load devices 244 and 245 are now turned on. Node capacitance C311 is charged via the conduction channels of these two turned on transistors to a value of $-V_0+V_t$ volts. It should also be noted at this point that the internal node capacitance C260 has been previously charged to a value of $-V_0+V_t$ volts via the conduction channel of P-MOS 244 during the negative portion of clock phase $\phi1$ just prior to $t_1$. Also during the $\phi1$ precharge interval from $t_1$ to $t_2$, the clock phases $\phi3$ and and $\phi4$ are at zero volt. Thus, P-MOS load device 145, 344 and 345 are turned off. As the voltage across node capacitance C311 becomes more negative than $-V_t$ volts, the inverter P-MOS device 314 turns on to provide a discharge path for internal node capacitance C360.

At time $t_2$ clock phase $\phi1$ switches toward zero volt and P–MOS device 244 turns off. Clock phase $\phi3$ switches toward the $-V_0$ volts level. P-MOS devices 314 and 344 turn off and on respectively. Internal node capacitance C360 is precharged via the channel of P-MOS 344.

The interval from $t_2$ to $t_3$ is the sample period for the $\phi1$ T-circuit 200. This interval is also the hold interval for both the driving $\phi3$ T-circuit 100 as well as the driven $\phi3$ T-circuit 300. The $\phi1$ T-circuit 200, therefore, samples the charge information contained on input node capacitance C211.

If the voltage across capacitance C211 is zero volt, P-MOS device 214 remains off and capacitances C260 and C311 remain charged to their precharge levels of $-V_0+V_t$ volts. That is the zero volt level is inverted by the $T_{12}$ circuit 200. On the other hand, if the voltage across the input capacitance C211 is $-V_0+V_t$ volts the P-MOS device 214 is turned on and both the internal node capacitance C260 and the input capacitance C211 are discharged to zero volt. In a similar manner, the charge information contained on the output capacitance C343 can be sampled during this period by the load circuits (not shown) which may be connected to output terminal 343.

At time $t_3$ clock phase $\phi2$ returns to zero volt, P-MOS device 245 turns off the isolates node capacitance C311 from changes in voltage level at the input to the $\phi1$ T-circuit 200. Also at time $t_3$ clock phase $\phi4$ switches to the $-V_0$ volts level. The P-MOS devices 145 and 345 turn on. The node capacitances C211 and C343 are precharged to the voltage of $-V_0+V_t$ volts. When clock phase $\phi3$ subsequently returns to zero volt at time $t_4$ the information contained on node capacitance C311 is sampled by the $\phi3$ T-circuit 300. This sampling process is similar to the manner in which the $\phi1$ T-circuit 200 sampled its input during the interval $t_2$ to $t_3$. Also at time $t_4$, clock phase $\phi1$ switches to $-V_0$ volts, P-MOS device 244 turns on and internal capacitance node C260 precharges to $-V_0+V_t$ volts.

At time $t_5$ clock phase $\phi4$ returns to zero volt and clock phase $\phi2$ switches to $-V_0$ volts. P-MOS devices 145 and 345 turn off to isolate capacitances C211 and C343 from their respective inputs. Now the $\phi3$ T-circuits are in their holding period, thereby permitting valid sampling of their respective outputs when the corresponding driven $\phi1$ T-circuit is prepared to sample.

Also at time $t_5$ clock phase $\phi2$ changes to $-V_0$ volts. The P-MOS device 245 turns on; and node capacitance C311 again is precharged thereby beginning another cycle of the clock. Thus, the cascaded T-circuits are operable in one cycle of the clock to translate information from the input capacitance C211 to the output capacitance C343 with a delay of one clock period. For succeeding cycles of the clock the circuit operation is the same as described above.

It is noted at this point that noise feed-through associated with the turn on and turn off of the clock signals does not result in serious signal degradation in the shift register system of FIG. 4. For example, when clock phase $\phi3$ turns on (changes to $-V_0$ volts) at time $t_2$, negative going signal transitions appear at the source and drain leads 314*s* and 314*d*. These signal transitions are coupled to the input capacitance C311 via the inter-load capacitance (not shown) of P-MOS device 314. However, phase $\phi2$ is still at $-V_0$ volts and phase $\phi1$ is at 0 volt. The P-MOS device 245 is turned on. For the case where P-MOS device 214 is also turned on ($-V_0+V_t$ volts on capacitance C211) the two negative feed-through transitions are discharged to ground ($\phi1$ is 0 volt). The proper information then for capacitance C311 is 0 volt. When phase $\phi3$ subsequently returned to 0 volt (time $t_4$), a positive going signal is coupled from source lead 314*s* to capacitance C311 enhancing the 0 volt information level. That is, $V_{gs}$ for P-MOS 314 is made more positive so that the P-MOS is less likely to turn on.

On the other hand, if at time $t_2$ P-MOS device 214 is turned off (0 volt on capacitance C211), the precharge voltage of $-V_0+V_t$ volts is the proper information for capacitance C311. Assuming equal charge distribution of the two negative transitions between C311 and C260 from $t_2$ to $t_3$, the positive feedthrough transition at time $t_3$ yields a net feedthrough to C311 of 0 volt.

Turning now to the FIG. 5 embodiment of the invention, a T-circuit drives a 2-H circuit and vice versa under the control of multi-phase clock signals. This feature of the invention permits a signal inversion or other logic operation to be obtained from a 2-H circuit rather than a T-circuit in the same amount of time (one clock period) as the non-inverted signal is translated by the FIG. 4 register system. In FIG. 5, the $\phi1$ T-circuit 200, a $\phi2$ 2-H circuit 300, and a $\phi3$ T-circuit 400, are connected in cascade in the named order.

Referring now to the four phase operation of the mixed T and 2-H circuit feature, the $\phi1$ T and $\phi3$ T-circuits operate in substantially the same manner as described above for FIG. 4. The operational activity for the $\phi2$ 2-H circuit is shown in FIG. 6 such that it can be compared to the activities for the $\phi1$ T and $\phi3$ T-circuits. The activity for the $\phi2$ 2-H circuit in FIG. 6 shows that its output capacity C411 is precharged when the clock phase $\phi 2$ is $-V_o$ volts and that its input capacitance C311 is sampled when the $\phi 2$ phase is 0 volt. This sampling is generally completed before the clock phase $\phi 3$ changes to 0 volt at time $t_4$. At this time, the P-MOS device 414 in stage 400 is enabled to sample the voltage across the capacitance C411 from $t_4$ to $t_5$. This latter sampling is indicated as the hold interval for the $\phi 2$ waveform in FIG. 6.

During this hold interval ($t_4$ to $t_5$) for the $\phi 2$ 2-H circuit the capacitance C411 as well as the capacitance C311 is isolated from changes in the charge condition of capacitance C211 since clock phase $\phi 2$ is at 0 volt thereby maintaining P-MOS device 245 in a turned off condition. Thus even though the input capacitance C211 for stage 200 may be changing its charge condition at this time, the capacitances C311 and C411 are unaffected.

The operational sequence then is as follows. In the interval from $t_1$ to $t_2$ the capacitance C311 is precharged via P-MOS devices 244 and 245 and capacitance C411 is precharged via P-MOS device 344. During the interval from $t_2$ to $t_3$ the charge condition of the input capacitance C211 is sampled by the stage 200. From $t_3$ to $t_4$ the 2-H stage 300 samples the charge condition of the capacitance C311. At time $t_4$ the clock phase $\phi 3$ returns to 0 volts, thereby enabling the P-MOS device 414 to sample the charge condition of the capacitance C411. At time $t_5$ clock phase $\phi 4$ returns to 0 volts. The P-MOS device 445 turns off and the charge condition of capacitance C443 is held for sampling by the driven or load stage (not shown). Thus, for the simple inversion logic shown for each of the stages in FIG. 5 a bit of information is translated from capacitance C211 to appear in inverted form at the output node 443 in one cycle of the clock. In the succeeding clock cycles, information is translated in a similar manner by the mixed T and 2-H system of FIG. 5.

The basic operational activity for 3-H circuits of precharge, sample and hold is also shown with the four phase 50% duty cycle clock signal waveform in FIG. 6. As there shown, a 3-H circuit precharges when its phase A is at $-V_0$ volts and samples and holds when its phase A is at 0 volt. As in the T-circuits, the phase B for 3-H circuits is also always the next succeeding phase for a particular phase A in order to assure that internal and output node capacitances are properly precharged during the precharge period so that charge redistribution is prevented during the sampling period.

By way of example to demonstrate the operation of the 3-H circuit, a $\phi 1$ 3-H circuit is selected. That is, $\phi A$ and $\phi B$ in FIG. 3 are $\phi 1$ and $\phi 2$, respectively. From FIGS. 3 and 6 it is seen that a $\phi 1$ 3-H circuit precharges its output capacitance for the entire $-V_0$ volts portion of the $\phi 1$ waveform since the P-MOS device 44 is turned on. At time $t_1$, the $\phi 2$ phase changes to $-V_0$ volts. The P-MOS device 50 turns on and internal node capacitance C61 precharges. At time $t_2$, clock phase $\phi 1$ returns to 0 volt turning P-MOS 44 off. The exemplary $\phi 1$ 3-H circuit is in its sample period from $t_2$ to $t_3$. At time $t_3$, clock phase $\phi 2$ returns to 0 volt turning P-MOS 50 off. From $t_3$ to $t_4$ the charge condition of output capacitance C43 is held (available for sampling by a driven circuit). At $t_4$, clock phase $\phi 1$ changes to $-V_0$ volts. The P-MOS 44 again turns on to precharge the capacitance C43. Thus, the additional series load P-MOSS device 50 provides an isolation function in that it isolates the output capacitance C43 from changes in the charge condition of input capacitance C11 during the hold period of $t_3$ to $t_4$.

The 3-H circuit can be used either with other 3-H, 2-H or T-circuits to construct desired digital systems. Again to determine what type of circuit can drive another, it is necessary to inspect and compare the operational activities of each. As previously pointed out, a first type of circuit can drive a second type of circuit of the output if the first circuit is isolated from data changes at its input when the first circuit output is being sampled.

By way of example, the table below lists the above-described circuit types which can be driven by T, 2-H and 3-H circuits of the $\phi 1$ type, i.e., A=1 for T and 3-H and B=1 for 2-H. Similar tables could be derived for $\phi 2$, $\phi 3$ and $\phi 4$ type circuits.

TABLE—DRIVING COMBINATIONS FOR $\phi 1$ CIRCUITS IN FOUR PHASE

| Gate type | Drives type | period (output node) | Input sampled | Output valid (hold) |
|---|---|---|---|---|
| $\phi 1$ (T) | $\phi 2$ (2-H) | $\frac{1}{2}\phi 1$ | $\frac{1}{2}\phi 2$ | $\phi 4$. |
| | $\phi 2$ (3-H) | (2nd half) | (2nd half) | |
| | $\phi 3$ (T) | | | |
| | $\phi 3$ (3-H) | | | |
| $\phi 1$ (3-H) | $\phi 2$ (T) | $\phi 1$ | $\frac{1}{2}\phi 2$ | $\frac{1}{2}\phi 3$. |
| | $\phi 2$ (3-H) | | (2nd half) | (2nd half). |
| $\phi 1$ (2-H) | $\phi 2$ (T) | $\phi 1$ | $\frac{1}{2}\phi 2$ | $\frac{1}{2}\phi 3$. |
| | $\phi 2$ (3-H) | | (2nd half) | (2nd half). |

THREE PHASE CLOCK SIGNALS

Turning now to the three phase features of the invention, the IGFET building clock circuits can be employed ni various combinations to construct desired systems. However, by way of example and convenience, substantially similar building block connections as in FIGS. 4 and 5 have been reproduced in FIGS. 7 and 8, respectively, to illustrate the three phase features for the three phase clock waveforms in FIG. 9. Consequently, like reference characters are employed to denote like circuits, components, connections, and the like. The FIGS. 7 and 8 systems do differ, however, from the FIGS. 4 and 5 systems in that the T-circuit clock phase types are different. Thus, in FIG. 7, T-circuit 300 is a $\phi 1$, $\phi 3$ T-circuit and the input driving circuit 100 is assumed to be a $\phi 1$, $\phi 3$ T-circuit. In FIG. 8, the T-circuit 400 is a $\phi 1$, $\phi 3$ T-circuit and the input driving circuit 100 is assumed to be a $\phi 1$, $\phi 3$ T-circuit.

Figure 7:
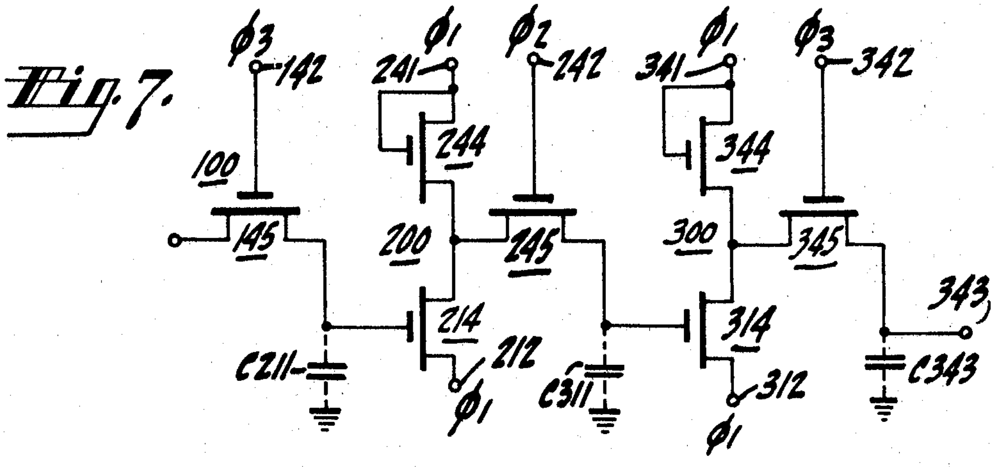
FIG. 7 is a circuit diagram of yet another embodiment of a three phase clock system employing the building block circuit of FIG. 1.
Figure 8:
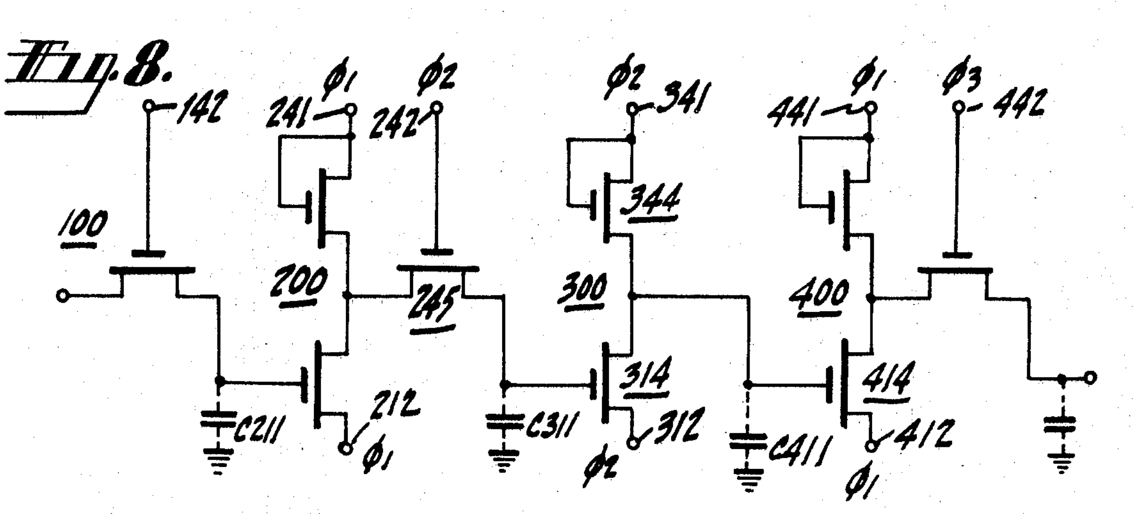
FIG. 8 is a circuit diagram of still another embodiment of a three phase clock system which employs the building block circuits of both FIG. 1 and FIG. 2.
Figure 9:
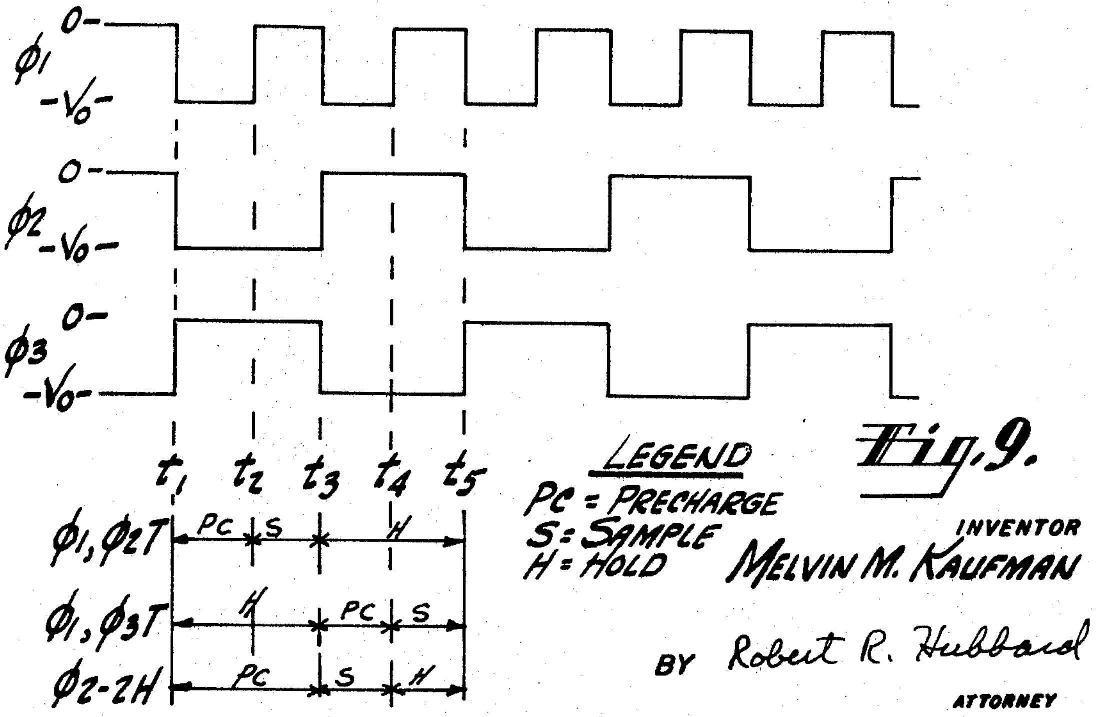
FIG. 9 is a waveform diagram of three phase clock signals for the FIGS. 7 and 8 systems.

The FIG. 7 and FIG. 8 systems can be operated under control of the three phase clock signals illustrated in FIG. 9. In FIG. 9, the clock signal phase $\phi 1$ is twice the frequency $f$ of the clock phase $\phi 2$; and the clock phases $\phi 2$ and $\phi 3$ are substantially 180° out of phase. That is, the clock signal $\phi 3$ lags phase $\phi 2$ by one-half the clock period ($t_3$—$t_2$). In addition, each clock phase has a 50% duty cycle.

Clock signal waveforms of this type could be generated by any suitable techniques. For example, the clock phase $\phi 1$ at a frequency $2f$ could be taken from the output of a free-running multivibrator. Clock phases $\phi 2$ and $\phi 3$ could then be obtained from complementary outputs of any suitable frequency divider, such as a triggerable flip-flop, having phase $\phi 1$ as an input.

The operational activity for the $\phi 1$, $\phi 2$ T-circuit 200 and for the $\phi 1$, $\phi 3$ T-circuit 300 are shown below the clock signal waveforms in FIG. 9 for the clock period defined from $t_1$ to $t_5$. As there shown, the $\phi 1$, 2 T precharges from $t_1$ to $t_2$, samples from $t_2$ to $t_3$ and holds from $t_3$ to $t_5$. The $\phi 1$, $\phi 3$, T holds from $t_1$ to $t_3$, precharges from $t_3$ to $t_4$ and samples from $t_4$ to $t_5$.

The circuit operation is as follows. At time $t_1$ clock phases $\phi 1$ and $\phi 2$ change from 0 volt to $-V_0$ volts and clock phase $\phi 3$ changes from $-V_0$ volts to 0 volt. The P-MOS devices 145, 345, 214 and 314 are turned off and devices 244, 245 and 344 are turned on. Just prior to $t_1$ the P-MOS device 145 had been turned on; and the circuit 100 had sampled its input (not shown). Thus, the proper information is stored on capacitance C211 and the $\phi 1$, $\phi 3$ T-circuit 100 is holding during the interval $t_1$ to $t_3$ as indicated in FIG. 9. Likewise, the $\phi 1$, $\phi 3$ T-circuit 300 is also holding from $t_1$ to $t_3$ while P-MOS device 345 is turned off.

From time $t_1$ to $t_2$, T-circuit 200 precharges capacitance C311 via the turned on P-MOS devices 244 and 245 to a voltage of $-V_0-V_t$ volts. Also, the internal node capacitances C260 and C360 are precharged at this time via P-MOS devices 244 and 344, respectively. At time $t_2$ clock phase $\phi 1$ returns to 0 volt. The P-MOS devices 244 and 344 turn off.

The $\phi1$, $\phi2$ T-circuit 200 now samples the input capacitance C211. For the case where there is 0 volt across C211, the P-MOS device 214 remains turned off. Capacitance C311 then retains its precharged value of $-V_0+V_t$ volts. The P-MOS device 314 turns on and discharges internal node capacitance C360. On the other hand, for an input voltage of $-V_0+V_t$ volts across C211, the P-MOS device 214 turns on to discharge capacitance C311 to substantially 0 volt. The P-MOS device 314 turns on and partially discharges internal node capacitance C360 for the portion of the $t_2$ to $t_3$ interval that the voltage across C311 is more negative than $-V_t$ volts.

At time $t_3$ clock phases $\phi1$ and $\phi3$ changes to $-V_0$ volts and clock phase $\phi2$ returns to 0 volt. The P-MOS devices 145, 244, 344 and 345 turn on and P-MOS devices 214 and 314 either turn off or remain turned off, as the case may be. The $\phi1$, $\phi2$ T-circuit 200 is now holding since P-MOS 245 is off. The $\phi1$, $\phi3$ T-circuits 100 and 300, however, are precharging the capacitances C211 and C343, respectively, to value of $-V_0+V_t$ volts. Also, the internal node capacitance C360 is again precharged via the channel of P-MOS device 344. At time $t_4$ clock phase $\phi1$ again returns to 0 volt. The P-MOS devices 244 and 344 turn off.

The $\phi1$, $\phi3$ T-circuits 100 and 300 now sample their respective input capacitances. Thus, P-MOS device remains turned off for the case where there is 0 volt across C311 and turns on for the case where there is $-V_0+V_t$ volts thereacross. For the former case, capacitance C343 retains its precharge value of $-V_0+V_t$ volts, while for the latter case, the capacitance C343 is discharged via the channels of P-MOS devices 314 and 345 to substantially 0 volt.

At time $t_5$ clock phases $\phi1$ and $\phi2$ change to $-V_0$ volts and clock phase $\phi3$ returns to 0 volt, thus beginning a new clock cycle. In the succeeding clock cycles, information is translated in a similar manner by the register system of FIG. 7.

Referring now to the three phase operation of the FIG. 8 mixed T and 2-H circuit feature of the invention, the $\phi1$, $\phi2$ and $\phi1$, $\phi3$ T-circuits operate in substantially the same manner as described above for FIG. 7. The operational activity for the $\phi2$ 2-H circuit in FIG. 9 shows that its output capacitance C411 is precharged during the interval from $t_1$ to $t_3$ when clock phase $\phi2$ is at $-V_0$ volts and that its input capacitance C311 is sampled during the interval from $t_1$ to $t_3$ when clock phase $\phi2$ is at $-V_0$ volts sampling is generally completed by time $t_4$ when phase $\phi1$ returns to 0 volt. From time $t_4$ to $t_5$, the P-MOS device 414 is enabled to sample the voltage across capacitance C411. Thus, the interval from $t_4$ to $t_5$ is indicated in FIG. 9 as the hold interval H for the $\phi2$ 2-H circuit.

In particular, the operational sequence is as follows. From $t_1$ to $t_2$, the $\phi1$, $\phi2$ T-circuit 200 and the $\phi2$ 2-H circuits precharge capacitances C311 and C411, respectively. From $t_2$ to $t_3$, the $\phi1$, $\phi2$ T-circuit 200 samples input capacitance C211. However, the $\phi2$ 2-H circuit 300 continues to precharge capacitance C411 at this time time since clock phase $\phi2$ is at $-V_0$ volts maintaining P-MOS 344 on and P-MOS 314 off. At time $t_3$, clock phase $\phi2$ returns to 0 volt, thereby enabling P-MOS 314 to sample the information stored on capacitance C311.

At time $t_4$, clock phase $\phi1$ returns to 0 volt, thereby enabling P-MOS 414 to sample the information stored on capacitance C411. During this interval from $t_4$ to $t_5$, clock phase $\phi2$ remains at 0 volt so that P-MOS 245 remains off to isolate the $\phi2$ 2-H circuit 300 as well as the $\phi1$, $\phi3$ T-circuit 400 from changes in the charge condition of input capacitance C211.

At time $t_5$ clock phases $\phi1$ and $\phi2$ change to $-V_0$ volts and clock phase $\phi3$ returns to 0 volt, thus beginning a new clock signal. In the succeeding clock cycles, information is translated in a similar manner by the mixed T and 2-H system of FIG. 8.

The three phase clock signals of FIG. 9 can be employed with other combinations of T and 2-H circuits to construct desired digital systems. Again the rule is that a first type of circuit can drive a second type of circuit if the output of the first circuit is isolated from data changes when the first circuit is being sampled. Tables similar to the heretofore illustrated table for four phase clock signals could be constructed for the FIG. 9 three phase clock signals.

What is claimed is:

1. The combination comprising
a load;
first and second circuits each having an input, an output and a plurality of clock terminals;
input circuit means for applying input signals to the input of the first circuit;
means for coupling the output of the first circuit to the input of the second circuit and for coupling the output of the second circuit to said load;
control means for causing said circuits to translate said input signals to the load, said control means including
clock generator means for generating plural phases of clock signals, each phase having approximately a 50% duty cycle, and
means including connection to each of said clock terminals for applying said plural phase clock signals thereto.

2. The invention according to claim 1
wherein each of the first and second circuits has first, second and third clock terminals; and
wherein each of first and second circuits further includes first, second and third field-effect transistors connected in circuit with one another and with the associated circuit input, output and clock terminals.

3. The invention according to claim 2 wherein said clock generator means generates four phases of clock signals.

4. The invention according to claim 3
wherein each of the first and second circuits has first, second and third clock terminals; and
wherein said control means applies first and second ones of the phases to the clock terminals of the first circuit and the third and fourth ones of the phases to the clock terminals of the second circuit.

5. The invention according to claim 4
wherein each successive clock phase lags its preceding phase by approximately 90 degrees, so that the first and third phases are approximately 180 degrees out of phase with each other and the second and fourth phases are approximately 180 degrees out of phase with each other;
wherein the first phase is applied to both the first and second clock terminals of the first circuit and the third phase is applied to both the first and second clock terminals of the second circuit; and
wherein the second and fourth phases are applied to the third clock terminals of the first and second circuits, respectively.

6. The invention according to claim 5
wherein each of the transistors has a channel and a gate electrode; and
wherein the channels of the first and second transistors in each circuit are connected in series with the associated first and second clock terminals, the gate electrode of the first transistor is connected to the associated circuit input, the gate electrode of the second transistor is connected to the first clock terminal, the gate electrode of the third transistor is connected to the associated third clock terminal, and the channel of the third transistor is connected in circuit with the associated series channel connection.

7. The invention according to claim 6
wherein the channel of the third transistor in each circuit is also coupled in series with the channels of the associated first and second transistors; and wherein the output for each circuit is taken from a point of the associated series channel connection.

8. The invention according to claim 7 wherein the channel of the third transistor in each circuit is coupled between the circuit output and a point of the associated series channel connection common to the channels of the first and second transistors.

9. The invention according to claim 8
wherein said means for coupling includes a third field-effect transistor circuit having first and second clock terminals, an input and a load transistor each having a gate and a channel, the channels of the input and load transistors being connected in series with the associated first and second clock terminals, the gate electrode of the load transistor being connected to the associated first clock terminal, the gate electrode of the input transistor being connected to the output of the first circuit, and the input of the second circuit is connected to a point of the third circuit series channel connection; and
wherein said second phase is applied to the first and second clock terminals of the third circuit.

10. The invention according to claim 2 wherein said control means applies first and second ones of said phases to the clock terminals of the first circuit and applies a third one of said phases and one of the first and second phases to the clock terminals of the second circuit.

11. The invention according to claim 10
wherein each of the first and second circuits has first, second and third clock terminals; and
wherein said control means applies first and second ones of the phases to the clock terminals of the first circuit and the third and fourth ones of the phases to the clock terminals of the second circuit.

12. The invention according to claim 11
wherein said first phase is twice the frequency $f$ of the second and third phases; the second and third phases being approximately 180 degrees out of phase with one another;
wherein the first phase is applied to both the first and second clock terminals of each of the first and second circuits; and
wherein the second and third phases are applied to the third clock terminals of the first and second circuits, respectively.

13. The invention according to claim 12
whrein each of the transistors has a channel and a gate electrode; and
wherein the channels of the first and second transistors in each circuit are connected in series with the associated first and second clock terminals, the gate electrode of the first transistor is connected to the associated circuit input, the gate electrode of the second transistor is connected to the first clock terminal, the gate electrode of the third transistor is connected to the associated third clock terminal, and the channel of the third transistor is connected in circuit with the associated series channel connection.

14. The invention according to claim 13
wherein the channel of the third transistor in each circuit is also coupled in series with the channels of the associated first and second transistors; and
wherein the output for each circuit is taken from a point of the associated series channel connection.

15. The invention according to claim 14 wherein the channel of the third transistor in each circuit is coupled between the circuit output and a point of the associated series channel connection common to the channels of the first and second transistors.

16. The invention according to claim 15
wherein said means for coupling includes a third field-effect transistor circuit having first and second clock terminals, an input and a load transistor each having a gate and a channel, the channels of the input and load transistors being connected in series with the associated first and second clock terminals, the gate electrode of the load transistor being connected to the associated first clock terminal, the gate electrode of the input transistor being connected to the output of the first circuit, and the input of the second circuit is connected to a point of the third circuit series channel connection; and
wherein said second phase is applied to the first and second clock terminals of the third circuit.

17. The invention according to claim 1 wherein said clock signals provide all of the operating power for such circuits.

18. The combination comprising
a load;
first and second circuits each having an input, an output and a plurality of clock terminals;
input circuit means for applying input signals to the input of the first circuit;
means for coupling the output of the first circuit to the input of the second circuit and for coupling the output of the second circuit to said load;
control means for causing said circuits to translate said input signals to the load, said control means including
clock generator means for generating three phases of clock signals, and
means including connections to each of said clock terminals for applying only said three phase clock signals thereto.

19. The invention according to claim 18
wherein each of the first and second circuits has first, second and third clock terminals; and
wherein each of first and second circuits further includes first, second and third field-effect transistors connected in circuit with one another and with the associated circuit input, output and clock terminals.

20. The invention according to claim 19 wherein said control means applies first and second ones of said three phases to the clock terminals of the first circuit and applies the third phase and one of the first and second phases to the clock terminals of the second circuit.

21. The invention according to claim 20
wherein each of the transistors has a channel and a gate electrode; and
wherein the channels of the first and second transistors in each circuit are connected in series with the associated first and second clock terminals, the gate electrode of the first transistor is connected to the associated circuit input, the gate electrode of the second transistor is connected to the first clock terminal, the gate electrode of the third transistor is connected to the associated third clock terminal, and the channel of the third transistor is connected in circuit with the associated series channel connection.

22. The invention according to claim 21
wherein said first phase is applied to the first and second clock terminals of each of the first and second circuits;
wherein said second and third phases are applied to the third clock terminals of the first and second circuits, respectively.

23. The invention according to claim 18 wherein said clock signals provide all of the operating power for such circuits.

24. The combination comprising
a load;
first and second circuits each having an input, an output and first, second and third clock terminals, a third circuit having an input, an output and only first and second clock terminals;
input circuit means for applying input signals to the input of the first circuit;
means for coupling the output of the first circuit to the input of the second circuit, for coupling the output of the second circuit to the input of the third circuit and for coupling the output of the third circuit to the load;

control means for causing said circuit to translate said input signals to the load, said control means including clock generator means for generating plural phases of clock signals, and means including connections to each of said clock terminals for applying said clock signal phases thereto.

25. The invention according to claim 24 wherein each of the first and second circuits includes first, second and third field-effect transistors and the third circuit has only first and second field-effect transistors;

wherein each of the transistors has a channel and a gate electrode; and wherein the channels of the first and second transistors in each circuit are connected in series with the associated first and second clock terminals, the gate electrode of the first transistor is connected to the associated circuit input, the gate electrode of the second transistor is connected to the first clock terminal, the gate electrode of the third transistor in each of the first and third circuits is connected to the associated third clock terminal, and the channel of the third transistor is connected between the output circuit and a point of the associated series channel connection common to the channels of the first and second transistors.

26. The invention according to claim 25 wherein each of said phases has a 50% duty cycle.

27. The invention according to claim 26 wherein said clock generator means generates four phases of clock signals.

28. The invention according to claim 26 wherein said clock generator means generates three phases.

29. The invention according to claim 24 wherein said clock signals provide all of the operating power for such circuits.

References Cited

UNITED STATES PATENTS

| | | | |
|---|---|---|---|
| 3,252,009 | 5/1966 | Weimer | 307—221 |
| 3,322,974 | 5/1967 | Ahrons et al. | 307—304 XR |
| 3,395,292 | 7/1968 | Bogert | 307—221 |
| 3,448,295 | 6/1969 | Wanlass | 307—304 XR |
| 3,454,785 | 7/1969 | Norman et al. | 307—251 XR |

OTHER REFERENCES

IBM Technical Disclosure Bulletin, vol. 8, No. 4, September 1965, pp. 640 and 641, titled Field Effect Transistor Clocked Logic, written by C. E. Ruoff.

STANLEY T. KRAWCZEWICZ, Primary Examiner

U.S. Cl. X.R.

307—205, 208, 221, 238, 247, 251

UNITED STATES PATENT OFFICE
CERTIFICATE OF CORRECTION

Patent No. 3,524,077 Dated August 11, 1970

Inventor(s) Melvin M. Kaufman

It is certified that error appears in the above-identified patent and that said Letters Patent are hereby corrected as shown below:

| | |
|---|---|
| Col. 1, line 65 | "mean" should be ---meant--- |
| Col. 5, line 6 | delete "to" |
| Col. 6, line 37 | "FIG. 8" should be ---FIG. 6--- |
| Col. 6, line 67 | "develop" should be ---overlap--- |
| Col. 7, line 22 | "circuits" should be ---circuit--- |
| Col. 8, line 1 | "the" should be ---and--- |
| Col. 8, line 46 | "returned" should be ---returns--- |
| Col. 9, line 63 | "P-MOSS" should be ---P-MOS" |
| Col. 10, Table Heading 3rd Col. | "period (output node)" should read ---Precharging period (output node) |
| Col. 10, line 20 | "ni" should be ---in--- |
| Col. 11, line 47 | delete "$t_1$ to $t_3$ when clock phase $\phi 2$ is at $-V_0$ volts" and insert ---$t_3$ to $t_5$ when phase $\phi 2$ is at 0 volt. This--- |
| Claim 13, line 2 | "whreein" should be ---wherein--- |

Signed and sealed this 13th day of April 1971.

(SEAL)
Attest:

EDWARD M. FLETCHER, JR.
Attesting Officer

WILLIAM E. SCHUYLER, JR.
Commissioner of Patents